(12) United States Patent
Föhrkolb

(10) Patent No.: US 12,311,457 B2
(45) Date of Patent: May 27, 2025

(54) METHOD FOR GRINDING A TOOTHING OR A PROFILE OF A WORKPIECE

(71) Applicant: KAPP NILES GMBH & CO. KG, Coburg (DE)

(72) Inventor: Andreas Föhrkolb, Niederfüllbach (DE)

(73) Assignee: KAPP NILES GMBH & CO. KG, Coburg (DE)

( * ) Notice: Subject to any disclaimer, the term of this patent is extended or adjusted under 35 U.S.C. 154(b) by 261 days.

(21) Appl. No.: 18/023,552

(22) PCT Filed: Aug. 21, 2021

(86) PCT No.: PCT/EP2021/073211
§ 371 (c)(1),
(2) Date: Feb. 27, 2023

(87) PCT Pub. No.: WO2022/048928
PCT Pub. Date: Mar. 10, 2022

(65) Prior Publication Data
US 2023/0302557 A1    Sep. 28, 2023

(30) Foreign Application Priority Data

Sep. 3, 2020  (DE) .................. 10 2020 123 073.7

(51) Int. Cl.
*B23F 1/02*  (2006.01)
(52) U.S. Cl.
CPC ..................... *B23F 1/02* (2013.01)

(58) Field of Classification Search
CPC ................................ B23F 1/02; B23F 5/085
See application file for complete search history.

(56) References Cited

U.S. PATENT DOCUMENTS

| | | | |
|---|---|---|---|
| 2,539,449 A | 1/1951 | Mackmann | |
| 3,053,017 A | 9/1962 | Rosenthal | |

(Continued)

FOREIGN PATENT DOCUMENTS

| | | | |
|---|---|---|---|
| DE | 3721949 A1 | 1/1988 | |
| DE | 4397508 T1 | 9/1995 | |

(Continued)

*Primary Examiner* — Kyle A Cook
(74) *Attorney, Agent, or Firm* — LUCAS & MERCANTI, LLP; Klaus P. Stoffel

(57) ABSTRACT

A method for grinding a toothing of a workpiece by a profile grinding wheel. The workpiece each have an axis of rotation. The grinding wheel has a center which lies on the axis of rotation of the grinding wheel and in the middle of the axial extent of the grinding wheel. The workpiece has an end face at least in an axial end region of the toothing or of the profile. The method includes the steps of: a) grinding the tooth gaps by the profile grinding wheel; b) grinding chamfers in the region of the axial end of the tooth gaps by the grinding wheel. The grinding wheel takes up a position in which it is arranged so that an axial end of the tooth gap is in contact with the grinding wheel. In projection onto a plane that contains the axis of rotation of the workpiece and the center of the grinding wheel, an angle of between 20° and 70° is enclosed between the axis of rotation of the workpiece and the connecting line between the axial end of the tooth gap and the center.

12 Claims, 5 Drawing Sheets

(56) References Cited

U.S. PATENT DOCUMENTS

| | | | |
|---|---|---|---|
| 5,681,207 A | 10/1997 | Nishida | |
| 6,234,880 B1* | 5/2001 | Scacchi | B23F 23/1225 |
| | | | 451/443 |
| 7,377,731 B1* | 5/2008 | Arvin | B23F 21/02 |
| | | | 409/12 |
| 8,527,085 B2 | 9/2013 | Breith | |
| 2005/0171631 A1* | 8/2005 | Arvin | G05B 19/4097 |
| | | | 700/182 |
| 2017/0021437 A1 | 1/2017 | Wyman | |
| 2017/0173713 A1* | 6/2017 | Thijssen | B23F 5/163 |
| 2017/0261068 A1* | 9/2017 | Zhao | B23F 9/082 |
| 2018/0297134 A1* | 10/2018 | Yoon | B23F 19/107 |
| 2019/0054554 A1* | 2/2019 | Sobczyk | B23F 17/006 |
| 2019/0061030 A1* | 2/2019 | Zimmermann | B23F 21/005 |
| 2020/0023445 A1* | 1/2020 | Schieke | B23F 19/107 |

FOREIGN PATENT DOCUMENTS

| | | |
|---|---|---|
| DE | 102008036549 A1 | 3/2010 |
| DE | 102013003804 A1 | 9/2014 |
| EP | 2093007 A2 | 8/2009 |
| EP | 3208023 A1 | 8/2017 |
| GB | 1038303 A | 8/1966 |

\* cited by examiner

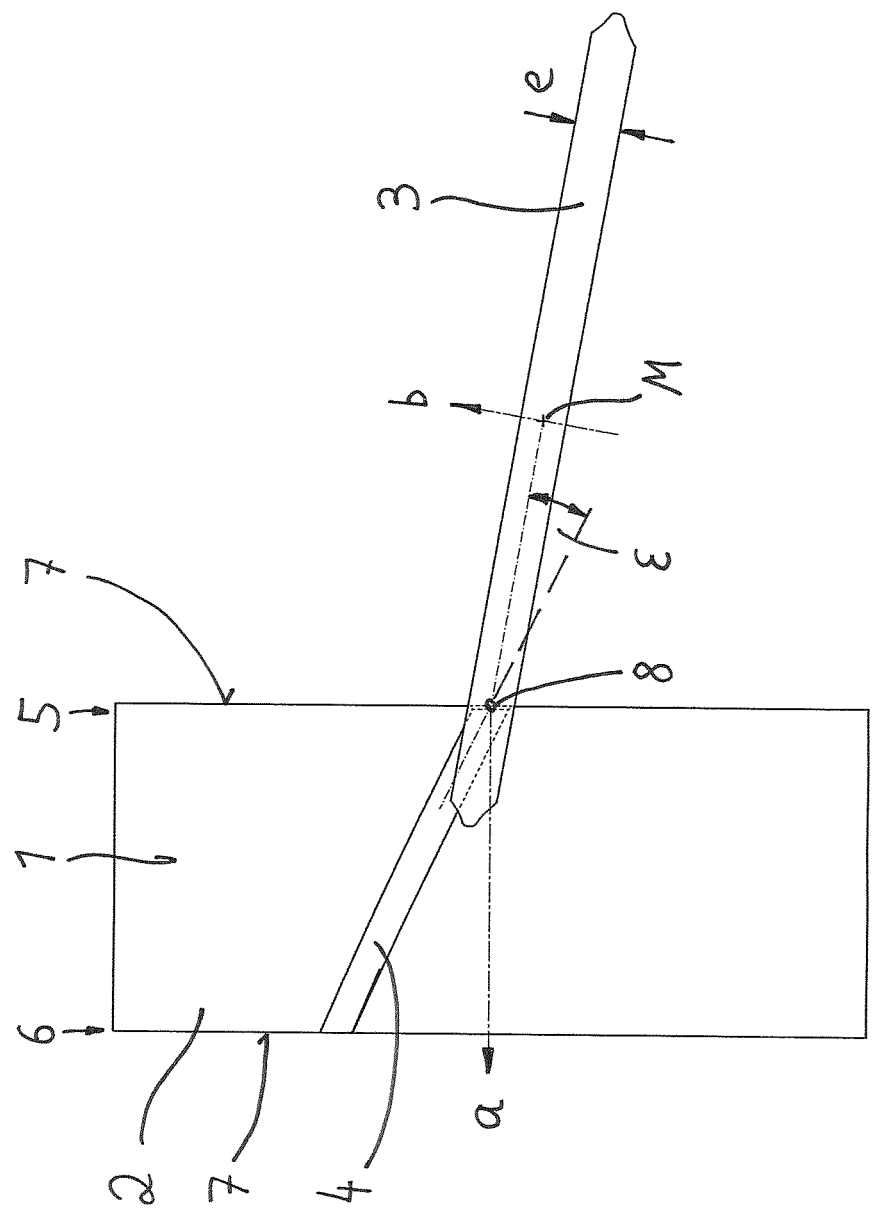

METHOD FOR GRINDING A TOOTHING OR A PROFILE OF A WORKPIECE

CROSS-REFERENCE TO RELATED APPLICATIONS

The present application is a 371 of International application PCT/EP2021/073211, filed Oct. 21, 2021, which claims priority of DE 10 2020 123 073.7 filed Sep. 3, 2020 the priority of these applications is hereby claimed and the applications are incorporated herein by reference.

BACKGROUND OF THE INVENTION

The invention relates to a method for grinding a toothing or a profile of a workpiece by means of a grinding wheel, wherein the grinding wheel is designed as a profile grinding wheel and is guided through pre-machined tooth or profile gaps or produces tooth or profile gaps, wherein the workpiece has an axis of rotation, wherein the grinding wheel has an axis of rotation and a center which lies on the axis of rotation of the grinding wheel and in the middle of the axial extension of the grinding wheel, and wherein the workpiece has an end face at least in one axial end region of the toothing or of the profile.

DE 43 97 508 T1 discloses a method of the generic type. Similar solutions are shown in DE 37 21 949 A1 and DE 10 2008 036 549 A1.

In the manufacture of toothings and similar profiles, it is common practice to first work the basic contour of the toothing to be produced from a blank by means of a pre-machining process (e.g. hobbing) into the still unhardened material; i.e. the tooth space is initially prefabricated in this respect. Depending on the size of the workpiece and the batch size, this can be followed by a machining step in which face chamfers are machined in. In the case of smaller batches and large workpieces, it is known to apply the face chamfer in a more or less defined manner manually, for which purpose angle grinders or axial grinders are used in particular. Special equipment is also sometimes used to produce the face chamfer by machine in a separate operation. This is followed by hardening of the workpiece and the prefabricated toothing. The final hard machining is then performed by grinding, in particular by profile grinding.

After grinding the toothing (especially in the case of an involute toothing), burr formation and/or sharp edges may occur at the face ends of the toothing (especially in the case of large material removal). This requires appropriate reworking (especially by hand). This problem arises to a particular extent if the gear teeth or profile are ground into the solid, i.e. if there is no pre-machining, in particular by hobbing, but instead the gear teeth or profile are machined into a cylindrical blank by grinding.

SUMMARY OF THE INVENTION

The invention is based on the object of further developing a generic method in such a way that it is possible to remove burrs from the axial ends of the toothing or profile in a simple and precise manner and to apply a defined chamfer there.

The solution of this object by the invention provides that the grinding of the toothing or profile comprises the steps:
a) Grinding of the tooth or profile gaps of the workpiece by means of the profile grinding wheel;
b) Grinding of chamfers in the region of the axial end of the tooth or profile gaps by means of the grinding wheel, wherein the grinding wheel is arranged in a position, or at least temporarily assumes a position during the grinding of the chamfers, in which the grinding wheel is arranged relative to the workpiece in such a way that an axial end of the tooth or profile gap contacts the grinding wheel, wherein in a projection on a plane including the axis of rotation of the workpiece as well as the center of the grinding wheel, between the axis of rotation of the workpiece and the connecting line between the axial end of the tooth or profile gap and the center an angle is included which lies between 20° and 70°.

According to a preferred embodiment of the invention, the profile grinding wheel is a dressable grinding wheel, wherein after carrying out above step a) and before carrying out above step b), the profile of the grinding wheel is changed by a dressing operation. Accordingly, the profile of the grinding wheel is changed from the one necessary for grinding the toothing or profile to the one with which the chamfers can be ground in the desired shape.

When carrying out above step a), the tooth or profile gaps can advantageously be ground from the solid in preferred applications.

Said step b) is preferably carried out by performing a relative infeed between workpiece and grinding wheel. The step can also be executed in such a way that the grinding wheel is guided relative to the workpiece perpendicular to the connecting line. Of course, it is further possible for the grinding wheel to be moved under NC control along a predetermined path in order to grind the chamfer.

The angle mentioned is preferably between 35° and 55°.

One possible embodiment of the method is that when grinding the chamfer, a plane passing through the center of the grinding wheel and perpendicular to the axis of rotation of the grinding wheel is aligned with the tooth or profile gap (see the embodiment according to FIG. 1 explained below).

Alternatively, it is also possible that during the grinding of the chamfer, a plane which passes through the center of the grinding wheel and is perpendicular to the axis of rotation of the grinding wheel is pivoted out of alignment with the tooth or profile gap by an angle. This angle is preferably between 2° and 25° (see the embodiment according to FIG. 5 explained below). In particular, it is intended that the angle in the case of grinding a helical gear lies between 2° and the helix angle of the toothing.

A further alternative embodiment of the method provides that when grinding the chamfer, the angle between the projection of the axis of rotation of the grinding wheel onto a center plane of the workpiece, which includes the axis of rotation of the workpiece, and the axis of rotation of the workpiece is 90°. In this case, the grinding wheel is displaced in the direction of its axis of rotation in such a way that the axial end of the tooth or profile gap contacts the grinding wheel (see the embodiment according to FIG. 4 explained below). In this case, it has proven useful if the grinding wheel is profiled in such a way that it has an asymmetrical profile. This makes it possible to grind the chamfer to an optimum or desired shape.

The chamfer is usually ground at the axial ends of all tooth or profile gaps. It is also usually ground in both axial end areas of the workpiece.

With the proposed procedure, a defined chamfering of the toothing or profile on the face side is possible by means of the profile grinding wheel, which is otherwise used for grinding the toothing or profile itself.

The proposed method is particularly preferred for the manufacture of involute toothings. However, it can also be used for other gears or profiles.

The method thus allows, using a profiled grinding wheel used in the special grinding position defined above, to apply the desired chamfers to the workpiece in a controlled and repeatable manner. If, according to the above-mentioned preferred embodiment of the invention, dressing of the grinding wheel to a modified profile takes place prior to grinding of the chamfers, it is possible to define the geometry of the chamfers to be ground, within certain limits, according to predetermined wishes.

The profile grinding wheel used to grind the toothing or profile is therefore, after appropriate positioning, also used specifically to grind a chamfer into the axial end region of the tooth or profile gap, which is done in particular by combining a radial and axial movement of the grinding wheel relative to the workpiece (by appropriate use of the NC axes of the machine). In this case, the positioning or adjustment (in particular with regard to the above-mentioned angle) is carried out according to the desired specifications for the design of the chamfer. In this way, it can be achieved in particular that the chamfer is ground evenly and is in particular and preferably parallel to the face of a pre-toothed helical gear.

The process is particularly advantageous for small batch production or the manufacture of large workpieces, whereby after the actual grinding process (possibly divided into roughing and finishing, grinding into the solid is also possible) the face chamfers are applied to the gear teeth in a defined manner.

In principle, the method can be used for involute gears as well as for other types of gears.

Advantageously, the described method is carried out as a part of or following directly after the grinding of the toothing or profile in the same clamping of the workpiece.

The method is particularly advantageous for large workpiece dimensions and a large number of teeth on the toothing.

Embodiment of the invention are shown in the drawings.

BRIEF DESCRIPTION OF THE DRAWING

FIG. 4 shows in perspective view and according to a third embodiment of the invention the gear in whose axial end region the chamfer is ground by means of the profile grinding wheel and FIG. 5 shows in perspective view and according to a fourth embodiment of the invention the gear in whose axial end region the chamfer is ground by means of the profile grinding wheel.

DETAILED DESCRIPTION OF THE INVENTION

Figure 1:
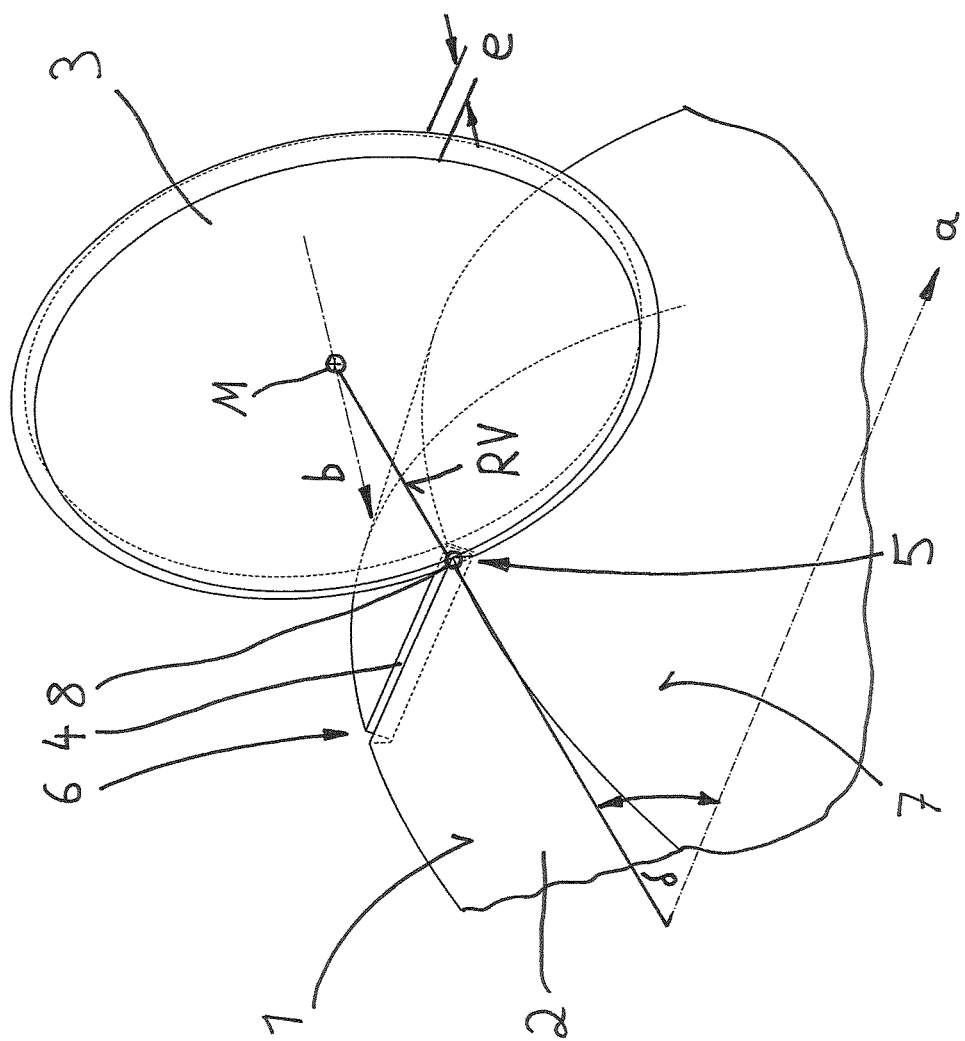
FIG. 1 shows in perspective view and according to a first embodiment of the invention a gear wheel in whose axial end region a chamfer is ground by means of a profile grinding wheel.

FIG. 1 shows a workpiece 2 in the form of a gearwheel, which has a toothing 1. The toothing 1 has pre-fabricated tooth gaps 4 (only one of which is shown; others are evenly distributed around the circumference of the workpiece 2). A profile grinding wheel 3 is used for grinding the toothing 1. This was passed through the tooth gap 4 in a known manner at a predetermined distance between the workpiece 2 and the grinding wheel 3 in order to provide the tooth gap with the final required contour (i.e. profile grinding was used to machine the toothing).

Figure 3:
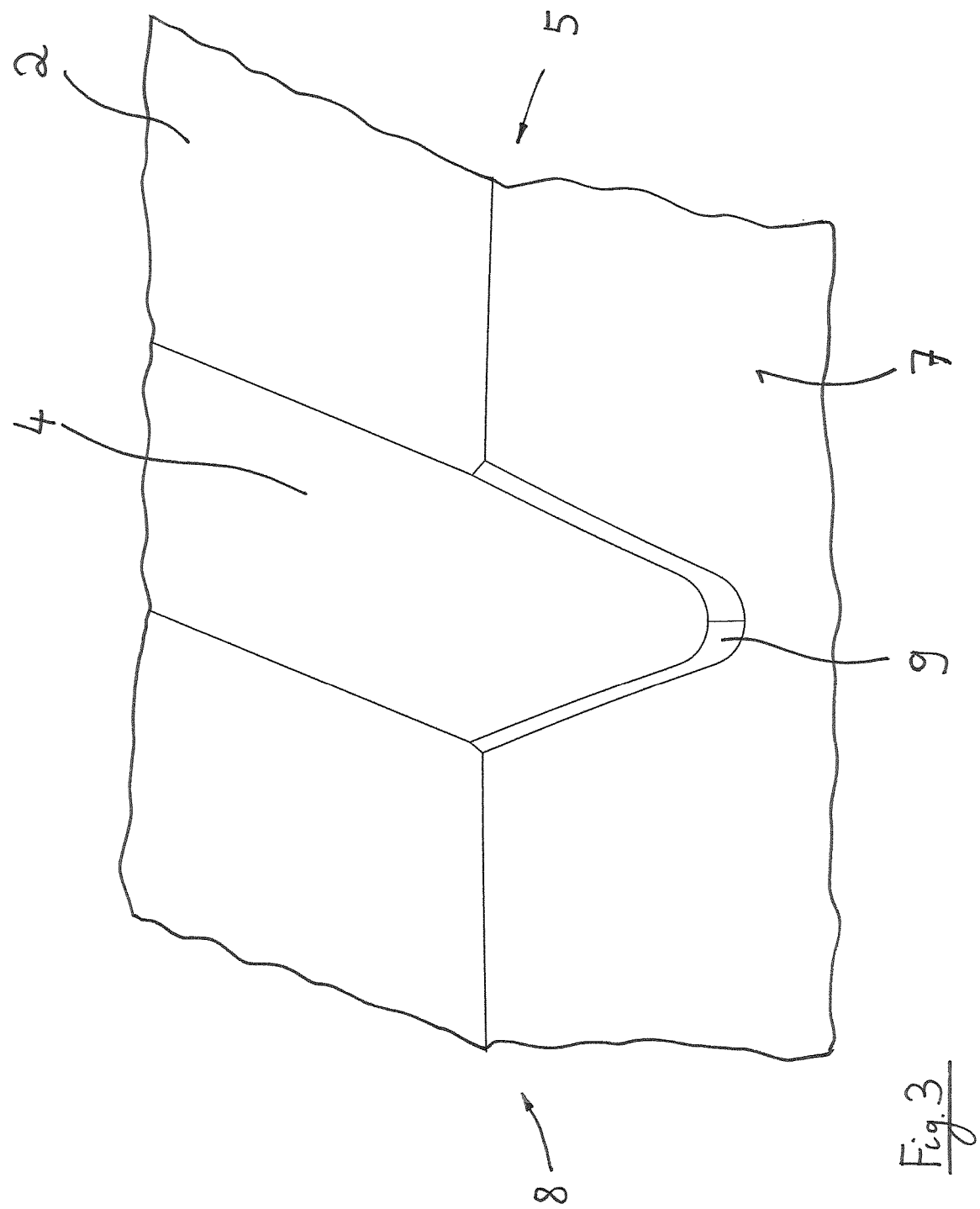
FIG. 3 shows in perspective view and in a magnified view the axial end area of the gear with the ground chamfer.

The toothing 1 has two axial end regions 5 and 6; here the two end faces 7 adjoin (of which only the front one can be seen in FIG. 1). In the area of the axial end 8 of the tooth gap 4, grinding may have resulted in the formation of a disturbing burr. Furthermore, the arrangement of a defined chamfer is desired here. In order to produce this by machine and automatically, the following procedure is used:

First, but not shown, the grinding wheel 3 is dressed again to a profile that has been specified for the desired chamfers (see FIG. 3).

Then the profile grinding wheel 3, with which the tooth gap 4 has already been ground, is moved to a position as shown in FIG. 1.

Accordingly, the axial end 8 of the tooth gap 4 is in the immediate vicinity of the grinding wheel 3. With regard to the position of the grinding wheel 3 relative to the workpiece 2, it results that in a projection onto a plane containing the axis of rotation a of the workpiece 2 as well as the center M of the grinding wheel 3, an angle $\delta$ is included between the axis of rotation a of the workpiece 2 and the connecting line RV between the axial end of the tooth or profile gap 8 and the center M, which in the embodiment according to FIG. 1 is approx. 45°.

In this case, the center M of the grinding wheel 3 results as a point on the axis of rotation b of the grinding wheel, which lies in the center of the axial extension e of the grinding wheel.

Figure 2:
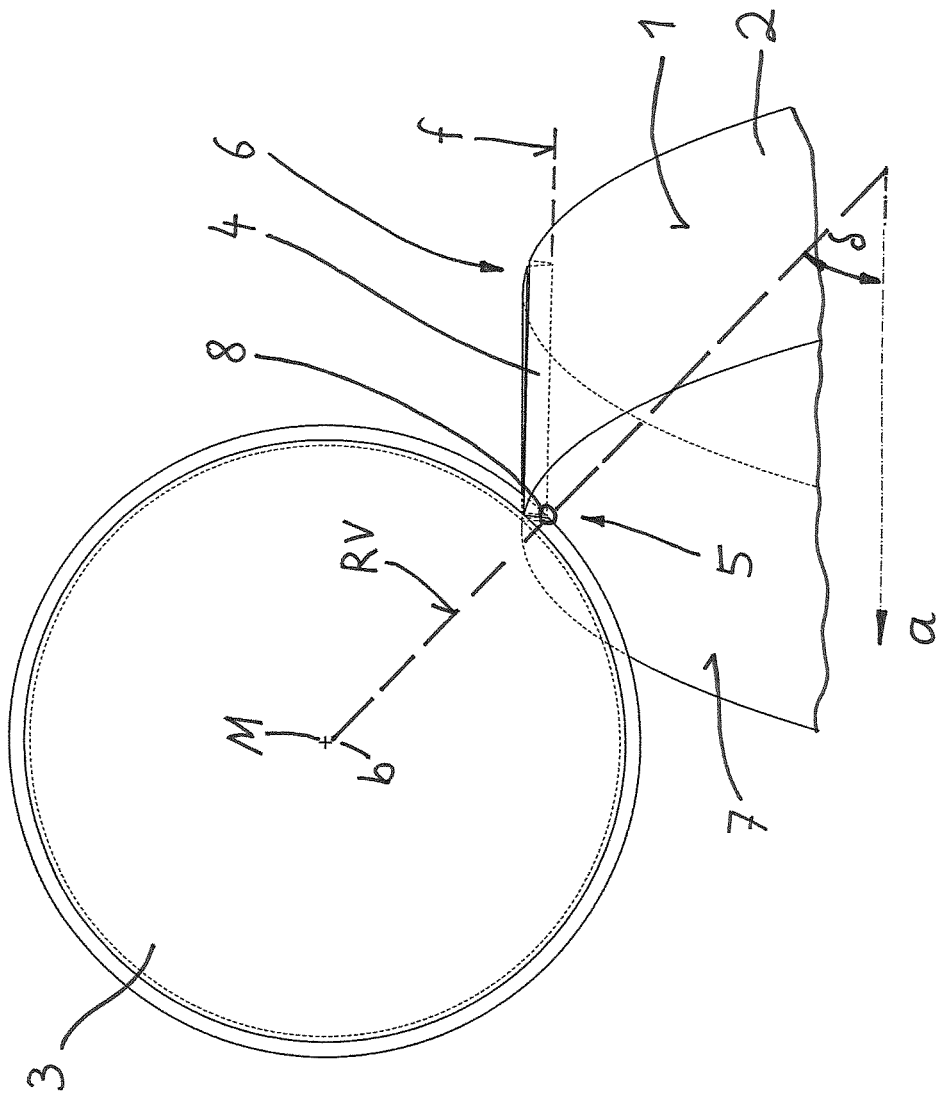
FIG. 2 shows in perspective view and according to a second embodiment of the invention the gear wheel in whose axial end region the chamfer is ground by means of the profile grinding wheel.

The connecting line RV is obtained when the grinding wheel 3 just contacts the axial end of the tooth gap 4, as it is also shown in FIG. 1 and FIG. 2. For the precise location of the axial end of the tooth or profile gap 8, refer to FIG. 2, where the root circle f of the toothing 1 is indicated; where the root circle f reaches the axial end of the workpiece 2, the axial end 8 of the tooth or profile gap is located.

Once the explained position has been reached, the chamfer is ground by means of the profile grinding wheel 3, in that the grinding wheel 3 is appropriately advanced relative to the workpiece 2 or guided along a predetermined path. The result of this process is shown in FIG. 3, where the chamfer 9 ground in this way is shown at the axial end of the profile gap 4.

FIG. 1 shows the case where a spur-toothed workpiece 2 is ground and then the chamfer is applied. It can be seen how the profile grinding wheel 3 is aligned with the tooth gap 4 when grinding the chamfer 9.

With regard to alignment, it should be noted that a plane containing the axis of rotation a of the workpiece is first defined; the axis of rotation b of the grinding wheel is displaced or projected until it is level with the axis of rotation a of the workpiece; the axis of rotation a and the displaced or projected axis of rotation b form said plane. Alignment occurs when the direction of the tooth or profile gap (at the axial runout from the workpiece 2), projected into said plane, and the direction perpendicular to the axis of rotation b, also projected into said plane, do not include an angle (or zero degrees).

This alignment is also present in the embodiment shown in FIG. 2. The difference between this and FIG. 1 is that this involves grinding a helical toothing. Otherwise, the same applies as was said in connection with FIG. 1. In particular, it is again apparent from FIG. 2 how the profile grinding wheel 3 has been brought into the said position (see angle δ) before the chamfer 9 is ground.

Figure 4:
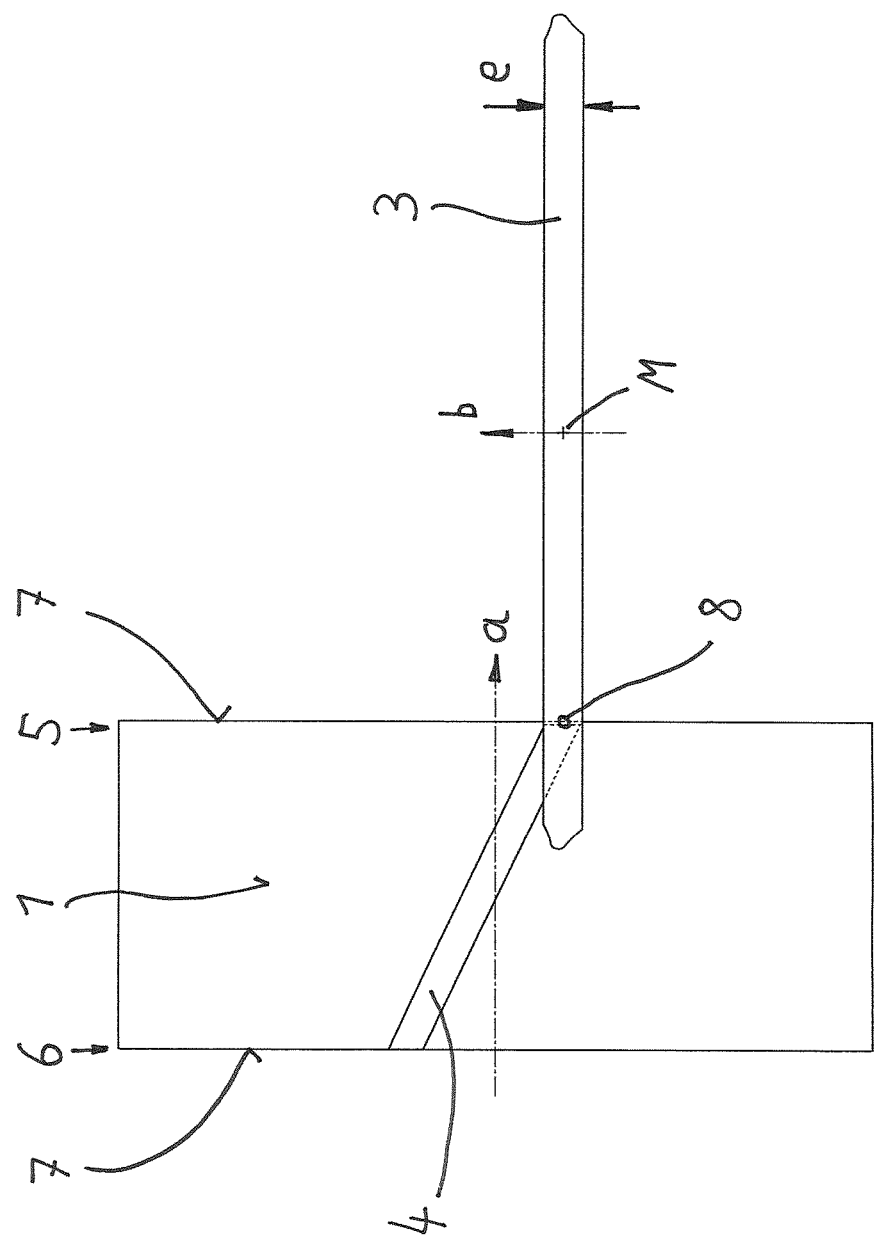

In the embodiment shown in FIG. 4, the profile grinding wheel 3 is not aligned with the tooth space 4. Instead, the grinding wheel 3 was shifted in the direction of its axis of rotation b (with simultaneous corresponding rotation of the workpiece 2 about its axis a) until again the positional relationships as in the case of FIGS. 1 and 2 were established. Working without the alignment (according to FIGS. 1 and 2) has the advantage, under given conditions, that the chamfer 9 can be applied favourably. In this respect, the embodiment according to FIG. 4 represents a particularly preferred solution according to the present invention.

Finally, depending on the given conditions, it may be advisable to grind the chamfer 9, as shown in the embodiment according to FIG. 5.

Again, the profile grinding wheel 3 is not aligned with the tooth gap 4. Now, however, the profile grinding wheel 3 has been deliberately rotated out of alignment by a swivel angle ε before the chamfer 9 is ground. This can also be very advantageous for optimizing the chamfer 9 with the desired profiling of the grinding wheel 3.

Depending on the specific application and namely on the particular geometry of the gap to be ground, it may therefore be possible to achieve an advantageous geometry for the chamfer to be ground by positioning the grinding wheel relative to the course of the tooth gap in a non-aligned manner.

The smaller the profile or pressure angle, the smaller the formation of the chamfer (i.e. the material removal) (the chamfer angle to the face becomes larger). Toothings with large profile or pressure angles or toothings in which the usable region of the profile is located away from the root circle of the tooth are therefore favourable.

The greater the curvature of the gear profile in the face cut, the more the chamfer angle varies within the flank.

A too large helix angle of the toothing can become problematic under certain conditions. This can be remedied by either reducing the setting angle or using an asymmetrical profiled grinding wheel.

This provides the general possibility of applying the desired chamfers (especially for deburring) to the workpiece in a controlled manner.

The method is particularly advantageous for workpieces with a large number of teeth, since these have hardly any curvature on the flanks and normally the usable region of the profile is far away from the root circle diameter.

EXAMPLE

A large workpiece was provided with involute toothing (number of teeth z=291, module m=9, width of b=260 mm). The toothing was thereby ground into the solid. The machining time for this was approx. 40 hours. Then the chamfers 9 were ground on both faces of the workpiece in the manner explained above. This resulted in a further machining time of approx. 1.5 hours for all chamfers. The workpiece remained in a single clamping for the complete operation. Only the grinding wheel 3 was reprofiled for grinding the chamfers by dressing.

For workpieces with gear teeth with a large helix angle, it may be useful or necessary to use a grinding wheel with an asymmetrical profile.

Of course, when using the proposed method, it should also be noted that by moving the grinding wheel to the position required for grinding the chamfer (as a result of the strong descent of the grinding wheel), there is no collision with other components (clamping devices, dressing unit, parts of the workpiece itself, etc.).

If, as a result of a too steep setting angle to the face side (for grinding the chamfer), foreseeable grinding into the flank occurs, the setting angle is set in such a way that this is prevented.

The above-mentioned (undesirable) grinding into the flank can also be prevented by swivelling the grinding wheel (see FIG. 5, swivel angle ε).

LIST OF REFERENCES

1 Toothing (profile)
2 Workpiece
3 Profile grinding wheel
4 Pre-machined tooth or profile gap/Tooth or profile gap to be produced
5 Axial end region of the toothing or profile
6 Axial end region of the toothing or profile
7 End face
8 Axial end of the tooth or profile gap
9 Chamfer
a Axis of rotation of the workpiece
b Axis of rotation of the grinding wheel
M Center of the grinding wheel
e Axial extension of the grinding wheel
f Root circle of the toothing or profile
RV Connecting line from axial end of the tooth or profile gap and center
δ Angle
ε Swivel angle

The invention claimed is:

1. A method for grinding a toothing or a profile of a workpiece by a grinding wheel, wherein the grinding wheel is designed as a profile grinding wheel and is guided through pre-machined tooth or profile gaps or produces tooth or profile gaps, wherein the workpiece has an axis of rotation, wherein the grinding wheel has an axis of rotation and a center which lies on the axis of rotation of the grinding wheel and in the middle of the axial extension of the grinding wheel, and wherein the workpiece has an end face at least in one axial end region of the toothing or of the profile, wherein the grinding the toothing or the profile comprises the steps:
   a) profile grinding the toothing of the workpiece using the profile grinding wheel, wherein the profile grinding wheel is guided through the pre-machined tooth or profile gaps or produces the tooth or profile gaps;
   b) grinding of chamfers in the one axial end region of the tooth or profile gaps by means of the grinding wheel, wherein the grinding wheel is arranged in a position, or at least temporarily assumes a position during the grinding of the chamfers, in which the grinding wheel is arranged relative to the workpiece in such a way that an axial end of the tooth or profile gap contacts the grinding wheel, wherein in a projection on a plane including the axis of rotation of the workpiece as well as the center of the grinding wheel an angle between 20° and 70° is included between the axis of rotation of the workpiece and a connecting line between the center and the axial end contacting the grinding wheel, wherein the profile grinding wheel is a dressable grinding wheel and that after carrying out step a) and before carrying out step b) the profile of the grinding wheel is changed by a dressing operation.

2. The method according to claim 1, wherein when carrying out step a) the tooth or profile gaps are ground from a solid material of the workpiece.

3. The method according to claim 1, wherein step b) is carried out by performing a relative infeed between the workpiece and the grinding wheel.

4. The method according to claim 1, wherein step b) is performed by guiding the grinding wheel relative to the workpiece perpendicular to the connecting line or along a predetermined path.

5. The method according to claim 1, wherein the angle is between 35° and 55°.

6. The method according to claim 1, wherein during grinding of the chamfers according to step b), a plane passing through the center of the grinding wheel and perpendicular to the axis of rotation of the grinding wheel is aligned with the tooth or profile gap.

7. The method according to claim 1, wherein, when grinding the chamfers according to step b), an angle between a projection of the axis of rotation of the grinding wheel onto a center plane of the workpiece, which includes the axis of rotation of the workpiece, is 90°.

8. The method according to claim 1, wherein the chamfers are ground at the axial ends of all the tooth or profile gaps.

9. The method according to claim 1, wherein the chamfers are ground in both axial end regions of the workpiece.

10. The method according to claim 1, wherein during grinding of the chamfers according to step b), a plane passing through the center of the grinding wheel and perpendicular to the axis of rotation of the grinding wheel is pivoted out of alignment with the tooth or profile gap by a pivoting angle.

11. The method according to claim 10, wherein the pivoting angle is between 2° and 25°.

12. The method according to claim 10, wherein, in the case of grinding a helical toothing, the pivoting angle is between 2° and the helix angle of the toothing.

* * * * *